H. L. BEACH.
ALTERNATING-DIRECT CURRENT SYSTEM OF CONTROL.
APPLICATION FILED MAR. 3, 1906.

929,185.

Patented July 27, 1909.
3 SHEETS—SHEET 1.

Fig.1.

H. L. BEACH.
ALTERNATING-DIRECT CURRENT SYSTEM OF CONTROL.
APPLICATION FILED MAR. 3, 1906.

929,185.

Patented July 27, 1909.
3 SHEETS—SHEET 3.

WITNESSES:
C. L. Belcher
Otto J. Schairer

INVENTOR
Howard L. Beach
BY
Keeley S. Carr
ATTORNEY

UNITED STATES PATENT OFFICE.

HOWARD L. BEACH, OF WILKINSBURG, PENNSYLVANIA, ASSIGNOR TO WESTINGHOUSE ELECTRIC & MANUFACTURING COMPANY, A CORPORATION OF PENNSYLVANIA.

ALTERNATING-DIRECT CURRENT SYSTEM OF CONTROL.

No. 929,185.     Specification of Letters Patent.     Patented July 27, 1909.

Application filed March 3, 1906. Serial No. 304,098.

*To all whom it may concern:*

Be it known that I, HOWARD L. BEACH, a citizen of the United States, and a resident of Wilkinsburg, in the county of Allegheny and State of Pennsylvania, have invented a new and useful Improvement in Alternating-Direct Current Systems of Control, of which the following is a specification.

My invention relates to electrical systems of control and particularly to systems of control for devices that are adapted to be operated by either alternating or direct current.

The object of my invention is to provide novel and effective means whereby the circuits of a system may be adjusted automatically in accordance with the character of energy supplied thereto.

Figure 2:
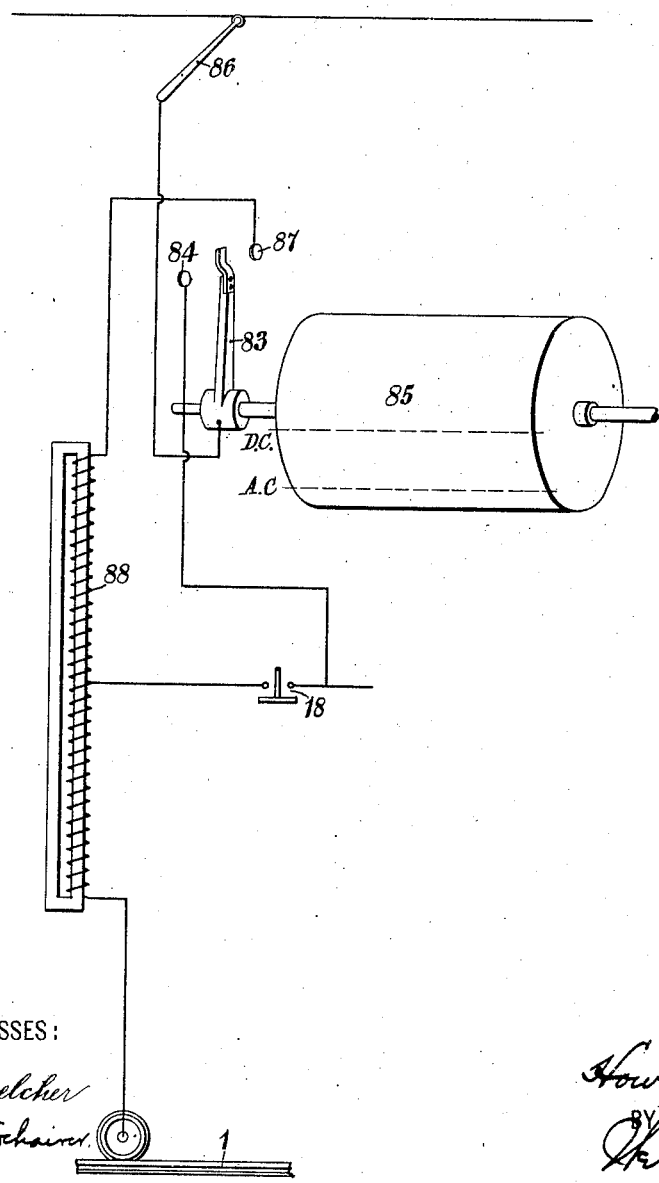
Figure 3:
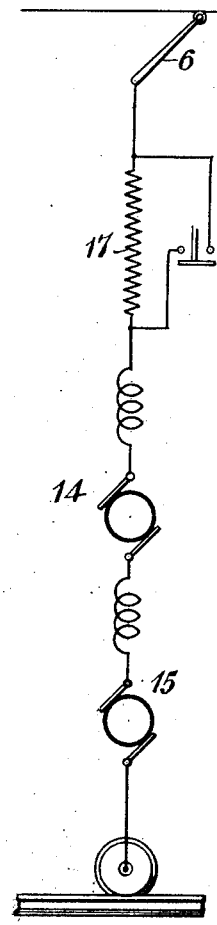
Figure 4:
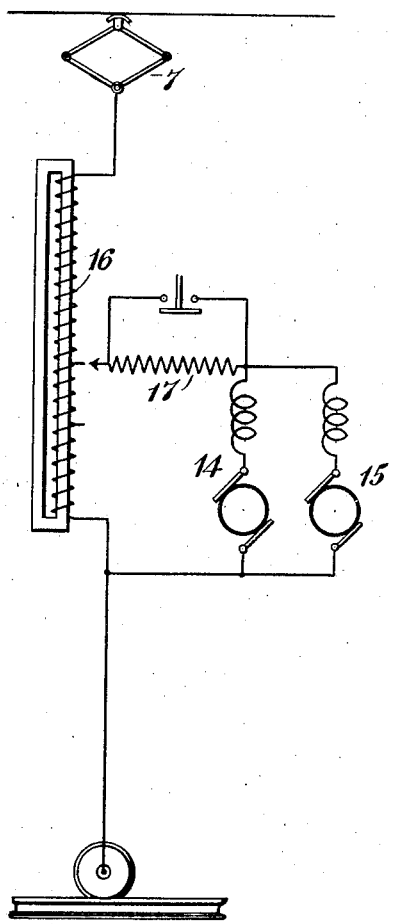

Figure 1 of the accompanying drawings is a diagrammatic view, of a system of control that embodies my invention and Fig. 2 is a diagrammatic view, of a modification of a portion of the system shown in Fig. 1. Fig. 3 illustrates, diagrammatically, the motor circuits for direct current operation, and Fig. 4 illustrates, similarly, the motor circuits for alternating current operation.

My invention may be conveniently applied to a railway vehicle that is supplied with energy from a grounded track rail 1 upon which the vehicle operates and trolley conductors 2 and 3, the former of which may be supplied with alternating current from any suitable source, such as that shown at 4, and the latter of which may be supplied with direct current from any suitable source, such as that shown at 5. A trolley 6 of the ordinary wheel type, or other suitable form, may be employed for the collection of direct current, and alternating current may be collected by means of a trolley 7 that is specially constructed for the purpose. A suitable structure for the trolley 7 comprises a pantograph frame 8, means such as springs 9 whereby the pantograph frame is normally maintained in a collapsed condition, a pneumatically-actuated device 10 for raising the pantograph frame to the position shown in broken lines and an electro-magnet 11 that governs the supply of fluid to the device 10.

The alternating voltage applied to the propelling motors 14 and 15 may be varied by varying the point of connection thereof with a transformer 16, and when direct current is supplied to the system, the voltage applied to the motors may be varied by means of a resistance 17.

Switches 18, 19, 20, 21, 22, 23 and 24 may be employed for effecting voltage changes in the motor circuits and for adjusting the circuit relations of the motors, the switches being provided with magnet windings 25, 26, 27, 28, 29, 30 and 31, respectively, whereby they may be operated or controlled in their operation. A change-over switch 35 that is normally retained in the "off" position, as shown, by means of centralizing springs 36, and that may be caused to operate to the positions indicated by broken lines D—C and A—C by means of magnet windings 37 and 38, respectively, serves to so control the circuits of the magnet windings 25 to 31, inclusive, that the motors 14 and 15 will be connected in series relation when the change-over switch occupies the position D—C, and so that the motors will be connected in parallel relation when the change-over switch occupies the position A—C. The circuits of the magnet windings 25 to 31, inclusive, are further controlled by means of a manually-operated master switch 39, that is adapted to occupy any one of the positions indicated by broken lines *a*, *b* and *c*.

One terminal of each of magnet windings 37 and 38 is connected to a battery 40 or other suitable source of energy wherefrom the auxiliary circuits of the system may be supplied, the remaining terminals being connected to stationary contact terminals 41 and 42, respectively, with which conducting segments 43 and 44, that are carried by the change-over switch, are adapted to engage and whereby they are normally connected to stationary contact terminals 45 and 46. The latter contact terminals are connected, respectively, to upper and lower contact terminals 47 and 48 of a relay switch 49 having an operating or controlling magnet winding 50 that is connected in series circuit with primary winding 51 of a transformer 52, between trolley collectors 6 and the grounded track rail 1. Upper and lower contact terminals 54 and 55 of the switch 49 are connected, respectively, to lower and upper contact terminals 56 and 57 of another relay switch 58 having an operating or controlling magnet winding 59 that is arranged in circuit with secondary winding 60 of the transformer 52. The remaining contact terminals 61 and 62 of the switch 58 are connected to one terminal of the battery 40 as are also stationary contact terminals 63 and 64 of another relay switch 65 having an operating or controlling magnet winding 66 that is connected between convenient points in the winding of the main transformer 16. Stationary contact terminal 67 of the switch 65 is connected to contact terminal 55 of the switch 49, and contact terminal 68 is connected to contact terminal 69, that is adapted to be engaged by conducting segment 70 when the change-over switch occupies position A—C. It is thereby connected to stationary contact terminal 71 to which one terminal of each of the magnet windings 25 to 31, inclusive, is connected. The contact terminal 71 is also adapted to be engaged by conducting segment 43 when the change-over switch occupies the position D—C. One terminal of the magnet winding 11, whereby the supply of fluid to the device 10 for raising the trolley 7 is governed, is connected to the battery 40 and the other terminal is connected to stationary contact terminal 72 that is adapted to be connected to the other terminal of the battery by means of a conducting segment 73 when the change-over switch is moved to the position A—C. A switch arm 74, that is adapted to be operated by the change-over switch, is moved into engagement with the stationary contact terminal 75 when the change-over switch is moved to the position D—C, one terminal of the motor circuit being thereby connected to the trolley 6. The switch arm 74 may be carried by a sleeve 76 that is loosely fitted upon an insulated extension 77 of the shaft 78 upon which the change-over switch is mounted and is normally secured thereto by means of a pin 79. If the pin 79 is withdrawn, the arm 74 may be moved into engagement with a stationary contact terminal 80 that is located without the normal arc of movement thereof, the transformer 16 being thereby connected to the trolley 6. Thus, in case of injury to the trolley 7, alternating current may be supplied to the system through the trolley 6 for such period as will permit operation of the vehicle to a place where repairs may be made.

In order to explain the operation of the system, let it first be supposed that the trolley collector 6 is raised into engagement with the conductor 3. A circuit is thereupon established by way of devices 51 and 50 to the ground and the switch 49 will be moved to its uppermost position by reason of the energizing of the magnet winding 50. When the switch 49 is moved to its uppermost position, a circuit is established between the terminals of the battery 40 by way of devices 62, 56, 54, 47, 45, 43, 41 and 37, and the change-over switch 35 will be moved to the position D—C because of the energizing of the magnet winding 37. The switch arm 74 is also moved into engagement with contact terminal 75. Movement of the change-over switch to the position D—C causes conducting segment 43 to engage contact terminal 71, one terminal of the magnet windings 25 to 31, inclusive, being thereby connected to the battery. If the master switch is then moved to the position a, a circuit will be established by way of devices bearing reference characters 40, 39, 28, 71, 43, 45, 47, 49, 54, 56, 58 and 62, and also a circuit by way of devices 40, 39, 90, 30, 71, etc. Magnet windings 28 and 30 will then be energized and switches 21 and 23 will close, thus connecting the motors in series relation with the resistance 17 in circuit. Movement of the master switch to the position b effects no change in the circuits, but movement to the position c causes the switch 20 to close, which thereby removes the resistance 17 from the circuit, the circuit of the magnet winding 27 of the switch 20 being by way of devices 40, 39, 27, 71, etc.

The motor circuits for direct current operation are illustrated, diagrammatically, in Fig. 3.

If the vehicle is moved from a section that is supplied with direct current to a section that is supplied with alternating current the trolley 6 will engage conductor 2 and a circuit will be established as before through devices 51 and 50 to the ground. However, when alternating current is supplied to this circuit the inductance of the primary winding 51 of the transformer will prevent energizing of the magnet winding 50 to such a degree as to cause operation of the switch 49. The secondary winding 60 of the transformer becomes energized by induction and the magnet winding 59 causes the switch 58 to move to its uppermost position, whereupon a battery circuit is established by way of devices 61, 57, 55, 48, 46, 44, 42 and 38. Energizing of magnet winding 38 causes the change-over switch 35 to move to the position A—C whereupon the conducting segment 70 engages contact terminals 69 and 71. Conducting segment 73 is also moved into engagement with contact terminal 72, magnet winding 11 being thereby connected between the terminals of the battery. When the magnet winding 11 is energized, fluid is admitted to the device 10 which immediately raises the trolley 7, into engagement with the conductor 2, and the trolley 6 may thereupon be lowered. When the trolley 7 engages the conductor 2, the main transformer 16 becomes energized, as does also magnet winding 66 of the switch 65, which thereupon closes. The circuit of the magnet winding 38 will then be established by way of devices 63, 67, 55, 48, 46, 44 and 42, it being understood that when the trolley 6 is lowered, the magnet winding 59 becomes deënergized and the switch 58 drops to its lowermost position. Then, since the conducting segment 70 engages contact terminals 69 and 71, one terminal of each of the magnet windings 25 to 31, inclusive, will be connected to the battery 40. If then, the master switch 39 is moved to the position $a$, switches 19, 21, 22 and 24 will close and the motors 14 and 15 will be connected in parallel relation between a suitable point 81 in the transformer 16 and the grounded track rail 1. When the master switch is moved to the position $b$, switches 18, 21, 22 and 24 close and the motors are connected in the same relation as before with resistance 17 in circuit between a higher voltage point 82 in the transformer 16 and the grounded track rail. When the switch is moved to the position $c$, switch 20 will also close and thereby remove the resistance 17 from the motor circuit.

The motor circuits for alternating current operation are illustrated, diagrammatically, in Fig. 4.

Since the specific arrangement of the circuits of motors and of magnet windings for the individually actuated switches, as well as the structures and arrangements of the parts of the change-over and master switches, form no part of my present invention, and are only illustrated as elements of a suitable system to which the invention may be applied, and also since the circuits of the system may be readily traced, I deem it unnecessary to describe them more in detail.

Since in practice, the alternating voltage which is supplied to the system will usually be very high, it is desirable, in order to avoid danger, that the trolley be lowered whenever the circuit is interrupted, as may occur when a car runs off the track or upon insulating material. This is effected in the present system, in the following manner. Upon interruption of the circuit of the transformer 16, the switch 65 opens and thereby interrupts the circuit of magnet winding 38. The change-over switch moves to its "off" position and the circuit of magnet winding 11 is interrupted, whereupon the trolley 7 is immediately collapsed by the springs 9 and the system is then entirely disconnected from the supply circuit. It will be readily understood that the trolley 7 will also collapse automatically when a vehicle that is provided with the system passes from a section that is supplied with alternating current to one which is supplied with direct current.

It may be desirable, in certain cases, to employ but a single trolley for the collection of both alternating and direct current, the trolley being automatically connected to the transformer or directly to the motor circuit according as alternating or direct current is supplied to the system. In Fig. 2, a switch arm 83 is caused to engage a contact terminal 84 when a change-over switch 85 occupies the position D—C, thereby connecting trolley 86 directly to the circuit which leads to the motors as in Fig. 1, and it is caused to engage a contact terminal 87 when the change-over switch is moved to the position A—C, the trolley 86 being thereby connected to transformer 88.

I claim as my invention:

1. In a system of control, the combination with a device that may be operated by either direct or alternating current, a change-over switch whereby the circuits of the system may be arranged for operation of the device by the one character of energy or the other, and controlling magnet windings therefor, of relay switches whereby the circuits of the controlling magnet windings are governed.

2. In a system of control, the combination with a device that may be operated by either direct or alternating current, a change-over switch whereby the circuits of the system may be arranged for operation of the device by the one character of energy or the other, and controlling magnet windings therefor, of relay switches whereby the circuits of the controlling magnet windings are governed, and means whereby operation of the relay switches is caused to depend upon the character of energy that is supplied to the system.

3. In a system of control, the combination with a device that may be operated by either direct or alternating current, a change-over switch whereby the circuits of the system may be arranged for operation of the device by the one character of energy or the other, and controlling magnet windings therefor, of relay switches whereby the circuits of the controlling magnet windings are governed and means operated by the change-over switch for establishing the circuit of the device when direct current is supplied to the system.

4. In a system of control, the combination with a device that may be operated by either direct or alternating current, a change-over switch whereby the circuits of the system may be arranged for operation of the device by the one character of energy or the other and controlling magnet windings therefor, of relay switches whereby the circuits of the controlling magnet windings are governed, controlling magnet windings therefor and means whereby only alternating current may be supplied to certain of the magnet windings and only operative amounts of direct current to the remaining winding.

5. In a system of control, the combination with a device that may be operated by either direct or alternating current, a change-over switch whereby the circuits of the system may be arranged for operation of the device by the one character of energy or the other and controlling magnet windings therefor, of relay switches whereby the circuits of the controlling magnet windings are governed, and interlocking switches that are operated by the change-over switch for further governing the circuits thereof.

6. In a system of control, the combination with a device that may be operated by either direct or alternating current, a change-over switch whereby the circuits of the system may be arranged for operation of the device by the one character of energy or the other and controlling magnet windings therefor, of relay switches whereby the circuits of the controlling magnet windings are governed, and means that are operated by the change-over switch for establishing and interrupting the circuits of the device.

7. In a system of control, the combination with a device that may be operated by either direct or alternating current, a change-over switch whereby the circuits of the system may be arranged for operation of the device by the one character of energy or the other and controlling magnet windings therefor, of relay switches whereby the circuits of the controlling magnet windings are governed, controlling magnet windings therefor, a current collector and a transformer, the primary winding of which is connected in series with the controlling magnet for one of the relay switches and the secondary winding of which supplies energy to the magnet winding of another relay switch.

8. In a system of control, the combination with a device that may be operated by either direct or alternating current, and means whereby the circuits of the system may be arranged for operation of the device by the one character of energy or the other, of current collectors that are especially adapted, respectively, for the collection of direct and alternating currents, and means whereby the collector for alternating current may be rendered operative when the circuits of the system are arranged for operation by alternating current.

9. In a system of control, the combination with a device that may be operated by either direct or alternating current, a change-over switch whereby the circuits of the system may be arranged for operation of the device by the one character of energy or the other and controlling magnet windings therefor, of relay switches whereby the circuits of the controlling magnet windings are governed, current collectors that are especially adapted, respectively, for the collection of direct and alternating current, means whereby certain of the relay switches are caused to depend in operation upon the position of the collector for direct current and means whereby the remaining relay switch is caused to depend in operation upon the position of the collector for alternating current.

10. In a system of control, the combination with a device that may be operated by either direct or alternating current, a change-over switch whereby the circuits of the system may be arranged for operation of the device by the one character of energy or the other and controlling magnet windings therefor, of relay switches whereby the circuits of the controlling magnet windings are governed, current collectors that are especially adapted, respectively, for the collection of direct and alternating current and means governed by the change-over switch for causing the collector for alternating current to become operative and inoperative.

11. In a system of control comprising main and auxiliary circuits, the combination with a device that may be operated by either direct or alternating current, a change-over switch whereby the circuits of the system may be arranged for operation of the device by the one character of energy or the other and controlling magnet windings therefor, of relay switches whereby the circuits of the controlling magnet windings are governed and means that are operated by the change-over switch whereby the main circuits of the system may be established.

12. The combination with a trolley conductor, a motor, a trolley and means for holding it in out-of-contact position when the motor circuit is open, of means for maintaining the trolley in contact position when the motor circuit is closed.

13. In a system of control, the combination with a trolley conductor, a motor, and a trolley, of means for effecting and maintaining engagement of the trolley with the conductor, and means for moving the trolley away from the conductor when the circuit of the motor is interrupted.

14. In a system of control, the combination with a current collector that is normally inactive and fluid-pressure-actuated means for rendering and maintaining the same active, of means whereby the application of fluid-pressure to said means is prevented when a circuit of the system is interrupted.

15. In a system of control, the combination with a current collector and a magnet winding for controlling operation thereof, of a switch in the circuit of the magnet winding that is opened when a circuit of the system is interrupted.

16. In a system of control, the combination with devices that may be operated by either direct or alternating current, and current collectors for direct and alternating current, respectively, of means whereby the collector for alternating current is rendered inactive when direct current is supplied to the system.

17. In a system of control, the combination with devices that may be operated by either direct or alternating current, and a current collector for alternating current, of means whereby the circuits are arranged in accordance with the character of energy that is supplied to the system and means for rendering the current collector inactive except when the circuits are arranged for operation by alternating current.

18. In a system of control, the combination with devices that may be operated by either direct or alternating current, and a current collector for alternating current, of means whereby the circuits are arranged in accordance with the character of energy that is supplied to the system and means whereby the current collector is automatically rendered active when the circuits are arranged for operation by alternating current.

19. In an electric car designed for operation on both alternating and direct current, a transformer in shunt to the power circuit of the car, two magnet windings connected respectively in series with the primary and secondary windings of the transformer, and switch-contacts controlled by said windings arranged to connect the power circuit of the car for operation on direct and alternating current respectively.

20. In an electric car designed for operation on both alternating and direct current, a current-collecting device, a motor-controller, a direct connection from said device to said controller, an inductive connection from said device to said controller comprising a transformer, a small transformer connected to said device in shunt to the motor circuit, a magnet winding in series with the primary of the small transformer, a switch-contact controlled thereby in said direct connection, a magnet winding in series with the secondary of the small transformer, and a switch-contact controlled thereby in said inductive connection.

In testimony whereof, I have hereunto subscribed my name this 28th day of February 1906.

HOWARD L. BEACH.

Witnesses:
   Thos. L. Howell,
   Birney Hines.